(12) United States Patent
Croak et al.

(10) Patent No.: US 7,440,445 B1
(45) Date of Patent: Oct. 21, 2008

(54) METHOD AND APPARATUS FOR STORING AND ACTIVATING UNIVERSAL RESOURCE LOCATORS AND PHONE NUMBERS

(75) Inventors: Marian Croak, Fair Haven, NJ (US); Hossein Eslambolchi, Los Altos Hills, CA (US)

(73) Assignee: AT&T Corp., New York, NY (US)

( * ) Notice: Subject to any disclaimer, the term of this patent is extended or adjusted under 35 U.S.C. 154(b) by 318 days.

(21) Appl. No.: 11/258,326

(22) Filed: Oct. 24, 2005

(51) Int. Cl.
*H04R 12/66* (2006.01)
(52) U.S. Cl. .................. 370/352; 709/204; 379/88.13
(58) Field of Classification Search ............. 379/88.13, 379/88.17; 370/352; 709/204
See application file for complete search history.

(56) References Cited

U.S. PATENT DOCUMENTS

| | | | |
|---|---|---|---|
| 5,999,525 A * | 12/1999 | Krishnaswamy et al. .... | 370/352 |
| 6,301,245 B1 * | 10/2001 | Luzeski et al. .............. | 370/352 |
| 6,754,181 B1 * | 6/2004 | Elliott et al. ................ | 370/252 |
| 2005/0053220 A1 * | 3/2005 | Helbling et al. ........ | 137/211.02 |
| 2006/0218580 A1 * | 9/2006 | Bushnell ...................... | 725/37 |

* cited by examiner

*Primary Examiner*—Suhan Ni

(57) ABSTRACT

A method and apparatus for enabling subscribers to store telephone numbers and/or URLs embedded in streaming video contents associated with a video session being shown on video display devices into address books hosted in the network. Subscribers can then access these phone numbers to place phone calls using information stored in the network address books by activating a voice session. Similarly, subscribers can also access URLs to browse websites using URLs stored in the network address books by activation a web session.

20 Claims, 6 Drawing Sheets

200

METHOD AND APPARATUS FOR STORING AND ACTIVATING UNIVERSAL RESOURCE LOCATORS AND PHONE NUMBERS

The present invention relates generally to communication networks and, more particularly, to a method and apparatus for storing and activating Universal Resource Locators (URL) and phone numbers from video content in communication networks, e.g., packet networks such as Service over Internet Protocol (SoIP) networks.

BACKGROUND OF THE INVENTION

As extremely high bandwidth access networks become more accessible to residential subscribers, they enable service providers of these networks to integrate voice, video, and data, thereby providing more convenience for end customers and creating new service opportunities. Due to the multi-service nature of these new services, networks need to provide additional functionalities to end customers to support integrated control of these different types of services. For instance, a network provider can embed useful information such as a phone number or a Universal Resource Locator (URL) related to the streaming video content being shown associated with a video session.

Therefore, a need exists for a method and apparatus for storing and activating Universal Resource Locators (URL) and phone numbers from video content in a packet network, e.g., a SoIP network.

SUMMARY OF THE INVENTION

In one embodiment, the present invention enables subscribers to store telephone numbers or URLs embedded in streaming video contents associated with a video session being shown on video display devices into address books hosted in the network. Subscribers can then access these phone numbers to place phone calls using information stored in the network address books by activating a voice session. Similarly, subscribers can also access URLs to browse websites using URLs stored in the network address books by activation a web session.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
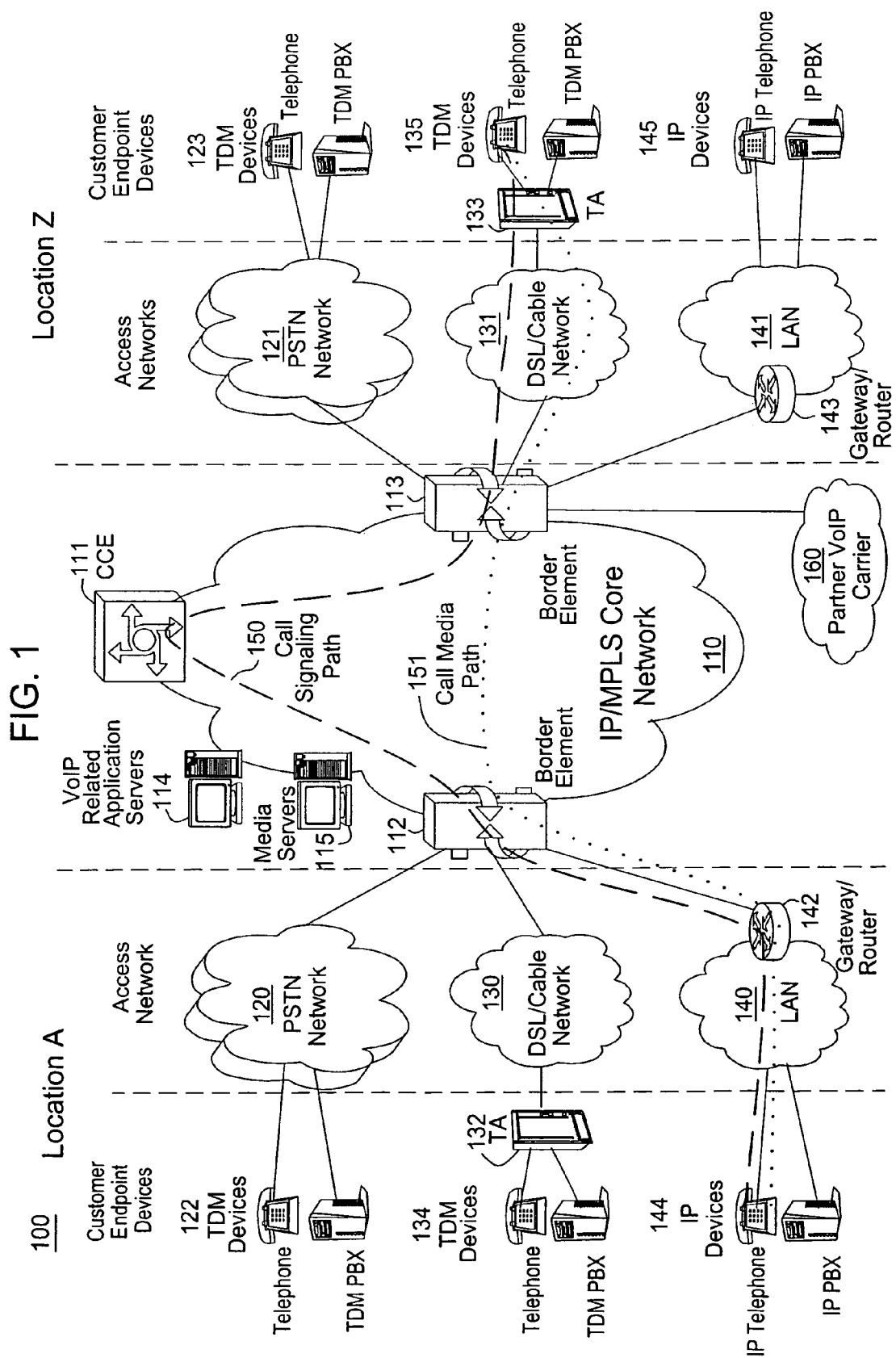
FIG. 1 illustrates an exemplary Voice over Internet Protocol (VoIP) network related to the present invention.

To better understand the present invention, FIG. 1 illustrates a communication architecture 100 having an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a SIP back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Figure 2:
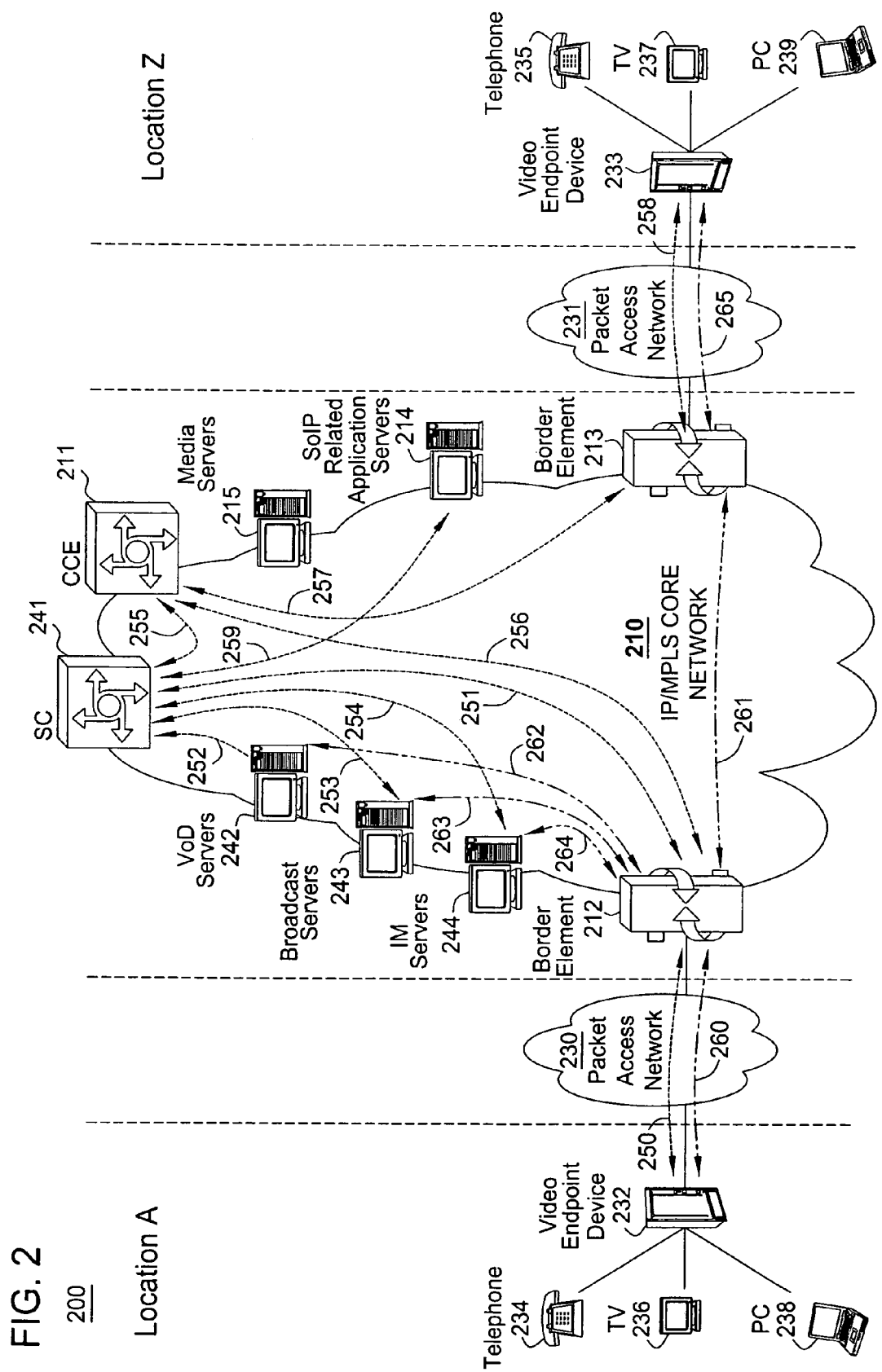
FIG. 2 illustrates an exemplary Service over Internet Protocol (SoIP) network related to the present invention.

The network shown in FIG. 1 can be extended to become a SoIP network that supports multi-service applications including, but not limited to, video services. FIG. 2 illustrates a communication architecture 200 having an example network, e.g., a packet network such as a SoIP network related to the present invention. A SoIP network supports multi-service applications including voice, data, and video services. In one embodiment, a SoIP network that supports video services is described below. In this SoIP network, voice services supported include, but are not limited to, VoIP services; data services supported include, but are not limited to, Instant Messaging (IM), electronic mail (email), internet access services, or any other IP based applications; and video services include, but are not limited to, Video on Demand (VoD), broadcast video, and video conferencing services.

A SoIP network that supports video services comprises an intelligent multi-service endpoint device connected via packet access networks to a service provider's SoIP core infrastructure employing Internet Protocol (IP) and/or Multi-Protocol Label Switching (MPLS) Protocols. Broadly defined, a SoIP network is a network that is capable of carrying voice, video, and data signals as packetized data over an IP network. The present invention is described below in the context of an illustrative SoIP network that supports video services. Thus, the present invention should not be interpreted to be limited by this particular illustrative architecture.

Video endpoint device 232 and 233 are IP based intelligent multi-service endpoint device supporting voice, video, and data applications. Video endpoint device 232 and 233 are signaling endpoints of application sessions, e.g. a VoIP session endpoint, an instant messaging endpoint, or a video session endpoint. In one embodiment, a video endpoint device is a standalone device that can be connected to home electronic appliances such as, but is not limited to, telephone 234 and 235, TV 236 and 237, or Personal Computer (PC) 238 and 239. In another embodiment, a video endpoint device can be integrated with a TV, a PC, or any home appliances with a display.

The access networks are packet based. Packet based access networks 230 and 231 use, but are not limited to, Frame Relay, ATM, Ethernet, IP, DSL or Cable broadband access network technologies to interconnect a video endpoint device to a SoIP network that supports video services.

The core SoIP infrastructure that supports video services comprises of several key components, such the Border Element (BE) 212 and 213, the Call Control Element (CCE) 211, SoIP related Application Servers (AS) 214, Media Servers (MS) 215, Session Controller (SC) 241, Video of Demand (VoD) Servers 242, Broadcast Servers (242), and Instant Messaging (IM) Servers 243. A BE resides at the edge of the SoIP core infrastructure and interfaces with customers endpoints over various types of access networks. The functions supported by a BE include those supported by a BE as previously described in network 100 and FIG. 1. In addition, in a SoIP network that supports video services, a BE also serves as a gateway between a video endpoint device used by a subscriber and the SoIP core network that supports video services. All application sessions initiated by a SoIP subscriber must gain entry to the SoIP core network via a BE. The functions supported by a CCE and a MS are the same as those previously described in network 100 and FIG. 1. A Session Controller (SC) resides within the SoIP infrastructure and is connected to the BEs using an IP based signaling protocol such as, but is not limited to, Session Initiation Protocol (SIP).

A SC is responsible for setting up all application session requests, such as VoIP call requests, video session requests, or data session requests, originated by a customer within the network and interacts with, if necessary, the appropriate SoIP related AS in order to complete an application session that requires certain service specific features originated by a customer. A SC also keeps track of all sessions initiated by a customer for session management and billing purposes as well. The functions supported by a SoIP related AS include those supported by a VoIP AS as previously described in network 100 and FIG. 1. In addition, a SoIP AS also supports all video specific application features. A VoD Server is responsible for supporting video on demand video session requests originated by a customer and sends the requested streaming video contents, such as a movie, to the customer. A Broadcast Server is responsible for supporting broadcast video session requested originated by a customer and sends streaming broadcast video contents, such as TV channels, to the customer. The VoD Server and the Broadcast Server sends streaming video contents to video endpoint devices using compression technologies including, but are not limited to, Moving Picture Experts Group (MPEG) 2, MPEG 4, MPEG 7, MPEG 21. An IM Server is responsible for supporting IM applications involving multiple users. Instant Messaging is a form of electronic communication that involves immediate typed text correspondence between two or more users over the Internet who are online simultaneously. IM is a text-based computer conference over the Internet between two or more people who are online at the same time.

In order to illustrate how the different components in a SoIP network operate to support video services, the following scenarios are used to illustrate how voice, data, and video sessions are setup between the SoIP network and a video endpoint. In one embodiment, a customer using video endpoint device 232 at location A places a VoD session request to the SoIP network that supports video services using TV 236. During the session initiation, a setup signaling message is sent from video endpoint device 232 to BE 212 using signaling path segment 250. BE 212 will then send a setup signaling message, such as a SIP-INVITE message if SIP is used, to SC 241 using signaling path segment 251. SC 241 processes the session requests and forwards the request to the appropriate server for further processing. In this case, the request is a VoD session; therefore, the request will be forwarded to VoD Server 242 using signaling path segment 252. SC 241 may interact with AS 214 using signaling path segment 259 to verify customer's subscription information or to retrieve video specific applications or data in order to complete the session request. Once the VoD session is verified, VoD Server 242 sends the requested VoD streaming contents to BE 212 using data path segment 262. BE 212 then forwards the requested VoD streaming contents to video endpoint 232 using data path segment 260. Similarly, a customer at location Z using TV 237 connected to video endpoint 233 can request a VoD session via SC 241 with streaming VoD contents sent by VoD Server 242. Note that a VoD server may be placed closer to end users in a packet access network to serve video endpoints in an alternative embodiment.

In another embodiment, a customer using video endpoint device 232 at location A places a broadcast video session request to the SoIP network that supports video services using TV 236. During the session initiation, a setup signaling message is sent from video endpoint device 232 to BE 212 using signaling path segment 250. BE 212 will then send a setup signaling message, such as a SIP-INVITE message if SIP is used, to SC 241 using signaling path segment 251. SC 241 processes the session requests and forwards the request to the appropriate server for further processing. In this case, the request is a broadcast video session for a particular premium TV channel; therefore, the request will be forwarded to Broadcast Server 243 using signaling path segment 253. SC 241 may interact with AS 214 using signaling path segment 259 to verify customer's subscription information or to retrieve video specific applications or data in order to complete the session request. Once the broadcast session is verified, Broadcast Server 243 sends the requested broadcast video streaming contents to BE 212 using data path segment 263. BE 212 then forwards the requested broadcast video streaming contents to video endpoint 232 using data path segment 260. Similarly, a customer at location Z using TV 237 connected to video endpoint 233 can request a broadcast video session via SC 241 with streaming broadcast video contents sent by Broadcast Server 243. Note that a Broadcast server may be placed closer to end users in a packet access network to serve video endpoints in an alternative embodiment.

In another embodiment, a customer using video endpoint device 232 at location A places an IM session request to the video network using PC 238. During the session initiation, a setup signaling message is sent from video endpoint device 232 to BE 212 using signaling path segment 250. BE 212 will then send a setup signaling message, including login and password information of the user, to SC 241 using signaling path segment 251. SC 241 processes the session requests and forwards the request to the appropriate server for further processing. In this case, the request to sign on an IM session; therefore, the request will be forwarded to IM Server 244 using signaling path segment 254. SC 241 may interact with AS 214 using signaling path segment 259 to verify customer's subscription information or to retrieve IM specific applications or data in order to complete the session request. Once the IM session is verified, IM Server 244 establishes the requested IM data path to video endpoint 232 via BE 212 using data path comprising data path segment 260 and 264. Similarly, a customer at location A using TV 236 connected to video endpoint 232 or a customer at location Z using PC 239 or TV 237 connected to video endpoint 233 can request an IM session via SC 241 with IM functions provided by IM Server 244.

In another embodiment, a customer using video endpoint device 232 at location A places a VoIP session request destined to video endpoint device 233 via the SoIP network that supports video services using telephone 234. During the session initiation, a setup signaling message is sent from video endpoint device 232 to BE 212 using signaling path segment 250. BE 212 will then send a setup signaling message, such as a SIP-INVITE message if SIP is used, to SC 241 using signaling path segment 251. SC 241 processes the session requests and forwards the request to the appropriate server for further processing. In this case, the request is a VoIP session for a call destined to a called party at location Z; therefore, the request will be forwarded to CCE 211 using signaling path segment 255. CCE may interact with AS 214 using signaling path segment 259 to verify customer's subscription information or to retrieve VoIP specific applications or data in order to complete the session request. The signaling flows to establish a VoIP call between video endpoint device 232 and 233 is similar to those described previously in network 100 and FIG. 1. In one embodiment, the Application Server (AS) functions as a SIP back-to-back user agent. Since BE 213 needs to be involved in completing the call; CCE 211 sends another call setup message, such as a SIP-INVITE message if SIP is used, to BE 213 using signaling path segment 257. Upon receiving the call setup message, BE 213 forwards the call setup message, via packet access network 231 to video endpoint device 233 using signaling path segment 258. Video endpoint device 233 then identifies telephone 235 and rings that telephone. Once the call is accepted at location Z by the called party, a call acknowledgement signaling message, such as a SIP 200 OK response message if SIP is used, is sent in the reverse direction back to the CCE 211. After the CCE 211 receives the call acknowledgement message, it will then send a call acknowledgement signaling message, such as a SIP 200 OK response message if SIP is used, toward the calling party at location A using signaling path comprising signaling path segment 256 and 250 via BE 212. In addition, the CCE 211 also provides the necessary information of the call to both BE 212 and BE 213 so that the call data exchange can proceed directly between BE 212 and BE 213. CCE 211 also provides the call completion status of a VoIP call to SC 241. The call media path comprising media path segment 260, 261, and 265 are illustratively shown in FIG. 2. Note that the call signaling path and the call media path are different because once a call has been setup up between two video endpoint devices, SC 241 and CCE 211 does not need to be in the data path for actual direct data exchange.

As extremely high bandwidth access networks become more accessible to residential subscribers, they enable service providers of these networks to integrate voice, video, and data, thereby providing more convenience for end customers and creating new service opportunities. Due to the multi-service nature of these new services, networks need to provide additional functionalities to end customers to support integrated control of these different types of services. For example, a network provider can embed useful information such as a phone number or a Universal Resource Locator (URL) related to the streaming video content being shown associated with a video session. A URL is the standard way to express the location of a resource on the Internet and provides a unique address which identifies a resource on the Internet for routing purposes.

To address this need, the present invention enables subscribers to store telephone numbers and/or URLs embedded in streaming video contents associated with a video session being shown on video display devices into address books hosted in the network. Subscribers can then access these phone numbers to place phone calls using information stored in the network address books by activating a voice session. Similarly, subscribers can also access URLs to browse websites using URLs stored in the network address books by activation a web session.

Figure 3:
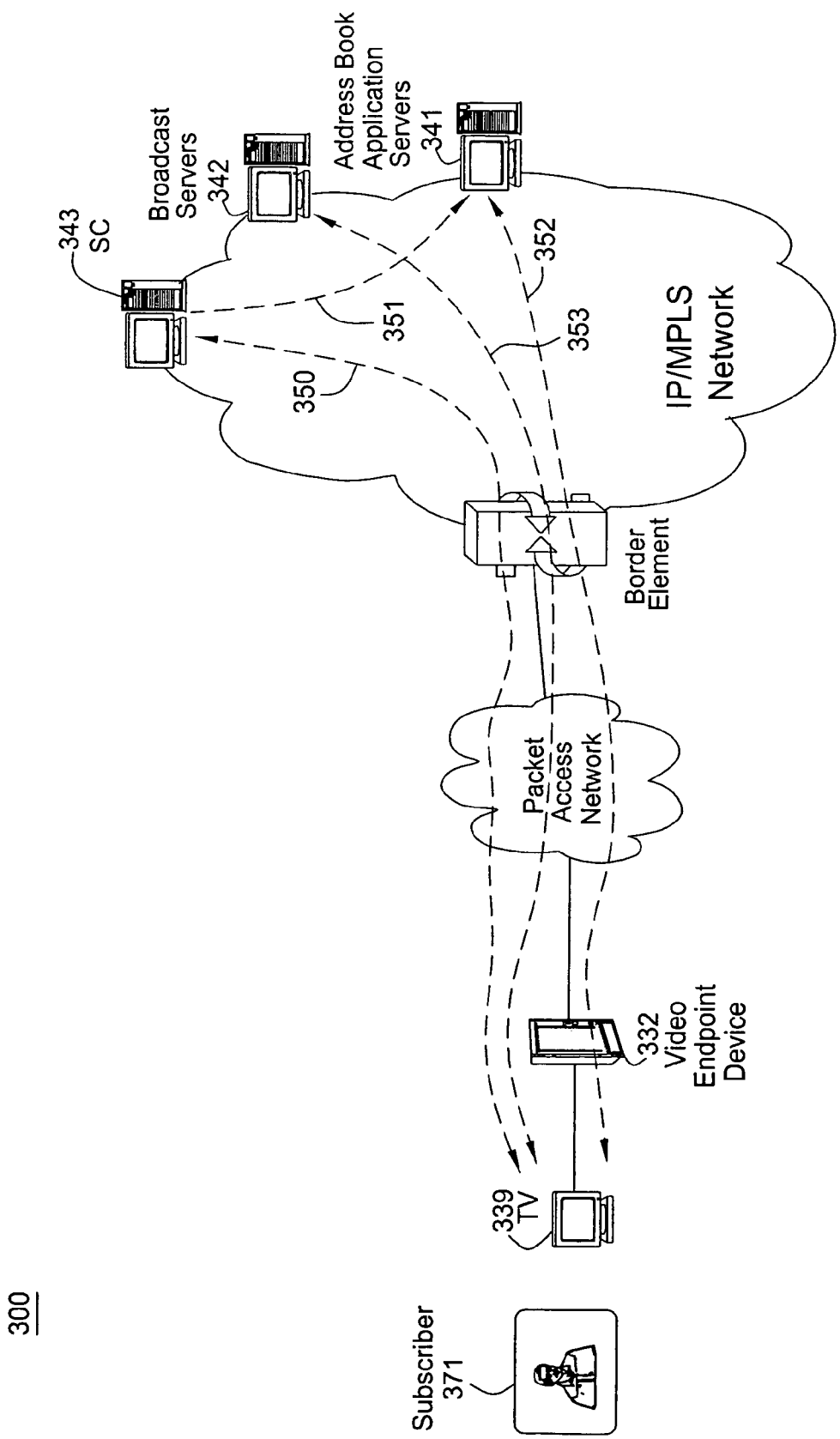
FIG. 3 illustrates an example of storing and activating Universal Resource Locators (URL) and phone numbers from video content in a packet network, e.g., a SoIP network, of the present invention.

FIG. 3 illustrates an example 300 of storing and activating Universal Resource Locators (URL) and phone numbers from video content in a packet network, e.g., a SoIP network, of the present invention. In FIG. 3, a subscriber 371 is watching video session on TV 339. Broadcast Server 342 sends a streaming video session of television programming via video endpoint device 332 to TV 339 using flow 353 to be viewed by subscriber 371. During the viewing of the TV programming, Broadcast Server 342 embeds a phone number and/or a URL related to the current segment of the TV programming into the streaming video session. When subscriber 371 sees the embedded phone number and the embedded URL address, subscriber 371 may decide to save this information in the network for later use.

For example, subscriber 371 sees a commercial of a product of interest and would like to obtain more information a later time. Thus, subscriber 371 will save an embedded phone number and/or a URL address that is associated with the product in the network for later reference. For example, subscriber 371 can use a pointer device, such as a computer mouse, to select the phone number and/or the URL address (e.g., shown as icons at a periphery of the broadcasted content) to be saved in the network. Once a phone number and/or URL address is selected for storage in the network, video endpoint device 332 sends a store request to SC 343 to establish an address book application session using flow 350. SC 343, in turn, finds out that the request is a phone number and/or URL address store request and forwards the store request to Address Book Application Server 341 using flow 351 to complete the session establishment. Once established, the Address Book Application Server 341 may communicate with subscriber 371 via video endpoint device 332 using flow 352. The selected phone number and/or URL address is then sent to Address Book Application Server 341, e.g., previously captured by the video endpoint device 332, using flow 352 for storage. Address Book Application Server 341 stores one or more phone number and/or URL address entries on a per subscriber basis. Alternatively, the phone numbers and/or URLs may be forwarded to the Address Book Application Server 341 from the SC 343 or the Broadcast Server 342.

At a later time, subscriber 371 sends a request to access the address book application to SC 343 using flow 350. In turn, SC 343 finds out that the request is a network based address book application access request and forwards the access request to Address Book Application Server 341 using flow 351 to establish an address book application session between subscriber 371 and Address Book Application Server 341 via flow 352. Then subscribe 371 reviews stored entries on Address Book Application Server 341 in an independent display frame on the video display device currently being used by the subscriber. Once a particular stored entry is selected, subscriber 371 can activate a phone number or a URL address by clicking it using a pointer device. If a stored phone number is activated, then a voice session destined to the store phone number will be initiated via SC 343 using flow 350. If a URL address is activated, then a web session destined to the URL address will be initiated via SC 343 using flow 350.

Figure 4:
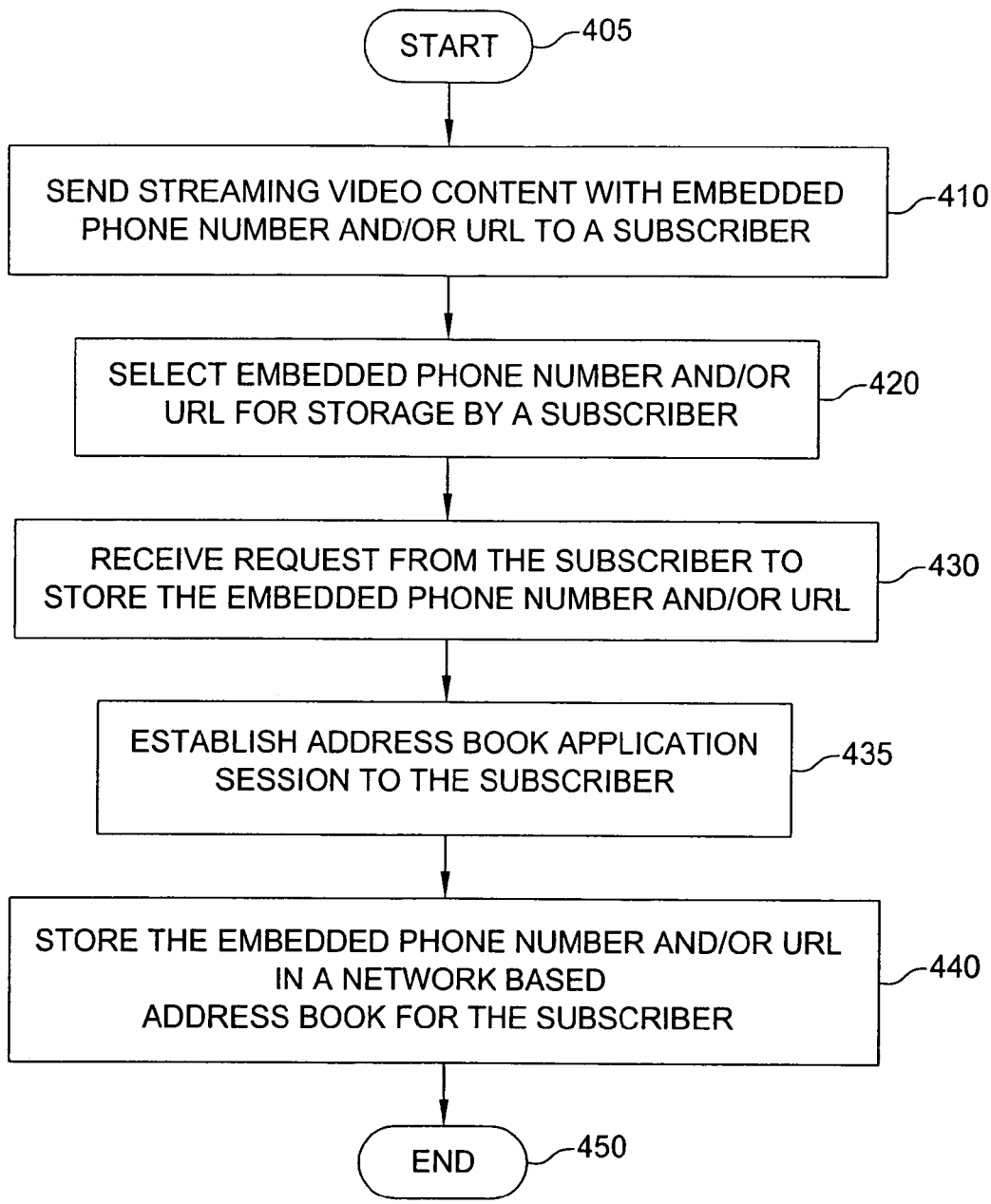
FIG. 4 illustrates a flowchart of a method for storing Universal Resource Locators (URL) and phone numbers from video content in a packet network, e.g., a SoIP network, of the present invention.

FIG. 4 illustrates a flowchart of a method 400 for storing Universal Resource Locators (URL) and/or phone numbers from video content in a packet network, e.g., a SoIP network, of the present invention. Method 400 starts in step 405 and proceeds to step 410.

In step 410, the method sends a streaming video session with an embedded phone number and/or URL address to a subscriber. The embedded phone number and/or URL address is sent by a Broadcast Server or a VoD Server.

In step 420, the subscriber selects the embedded phone number and/or URL address to be stored on a network based Address Book Application Server. The embedded phone number and/or URL address is selected by the subscriber using a pointer device, such as a computer mouse.

In step 430, the method receives a request to store the selected phone number and/or URL address. For example, the request is received by a SC.

In step 435, the method establishes an address book application session to the subscriber. The SC forwards the store request from the subscriber to the Address Book Application Server to establish the address book application session between the Address Book Application Server and the subscriber.

In step 440, the method stores the selected phone number and/or URL address in an address book entry of the address book associated with the subscriber on the Address Book Application Server. The selected phone number and/or URL address is stored by the Address Book Application Server. The method ends in step 450.

Figure 5:
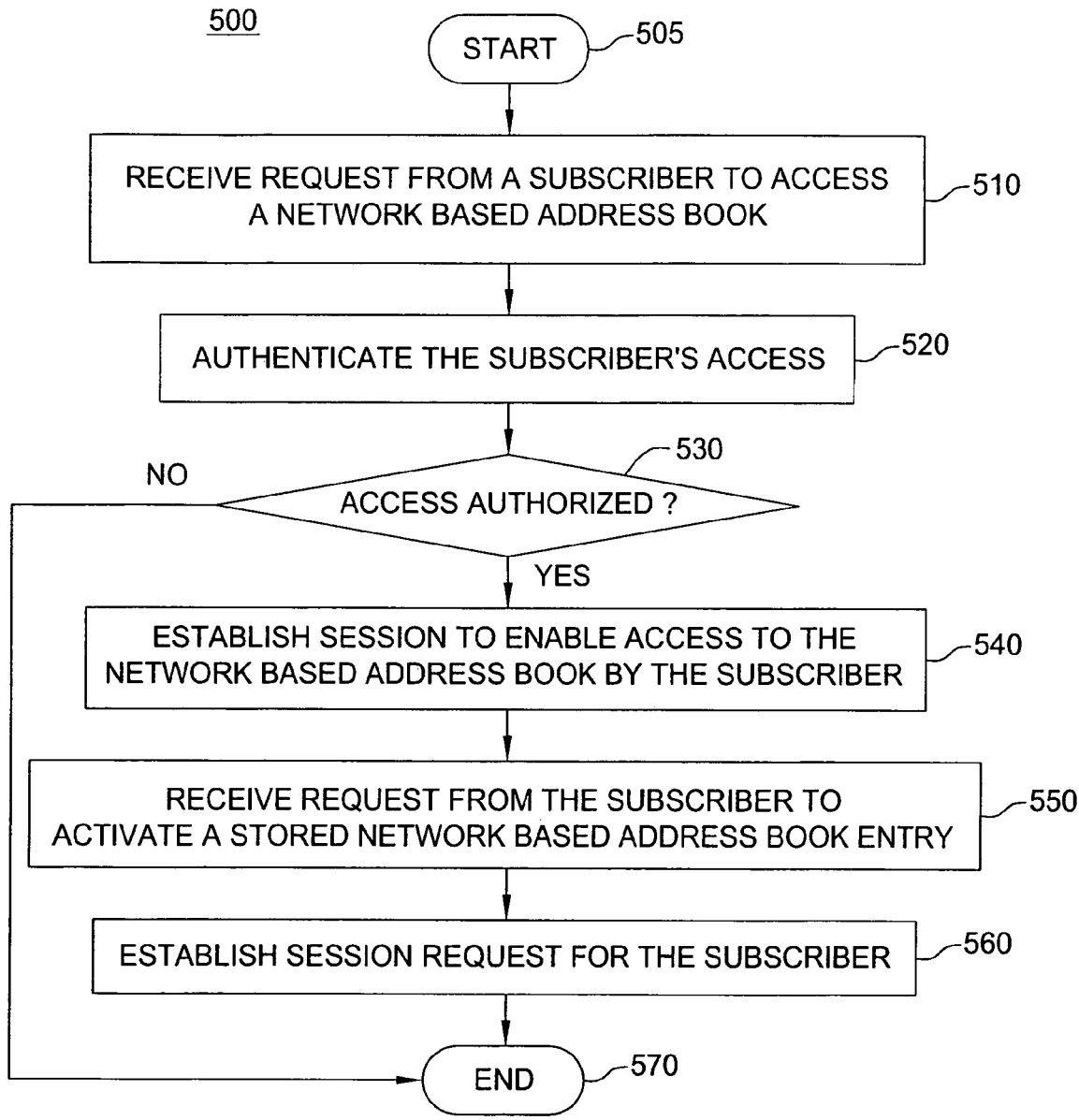
FIG. 5 illustrates a flowchart of a method for activating Universal Resource Locators (URL) and phone numbers from video content in a packet network, e.g., a SoIP network, of the present invention.

FIG. 5 illustrates a flowchart of a method 500 for activating Universal Resource Locators (URL) and phone numbers from video content in a packet network, e.g., a SoIP network, of the present invention. Method 500 starts in step 505 and proceeds to step 510.

In step 510, the method receives a request to access a stored address book at the Address Book Application Server. For example, the request is received by a SC.

In step 520, the method authenticates the access by the subscriber using a user name and a password supplied by the subscriber.

In step 530, the method checks if a proper user name and password have been authenticated. If the proper user name and password have been authenticated, the access is authorized and the method proceeds to step 540; otherwise, the method proceeds to step 570.

In step 540, the method establishes an address book application session to enable access to the network based address book by the subscriber. The SC sends the access request to an Address Book Application Server and the Address Book Application Server will establish an address book application session to the subscriber to allow access to the stored address book.

In step 550, the method receives a request from the subscriber to activate a particular selected address book entry, e.g., a phone number or a URL. The request is received by the Address Book Application Server.

In step 560, the method establishes the appropriate application session based on the activated address book entry type. The appropriate application session is established by the SC. If the activated session is a phone number entry, then a VoIP session destined to the phone number is established. If the activated session is a URL address, then a web session destined to the URL address is established. The newly initiated session will be displayed in an independent display frame on the video display device currently used by the subscriber. The method ends in step 570.

Figure 6:
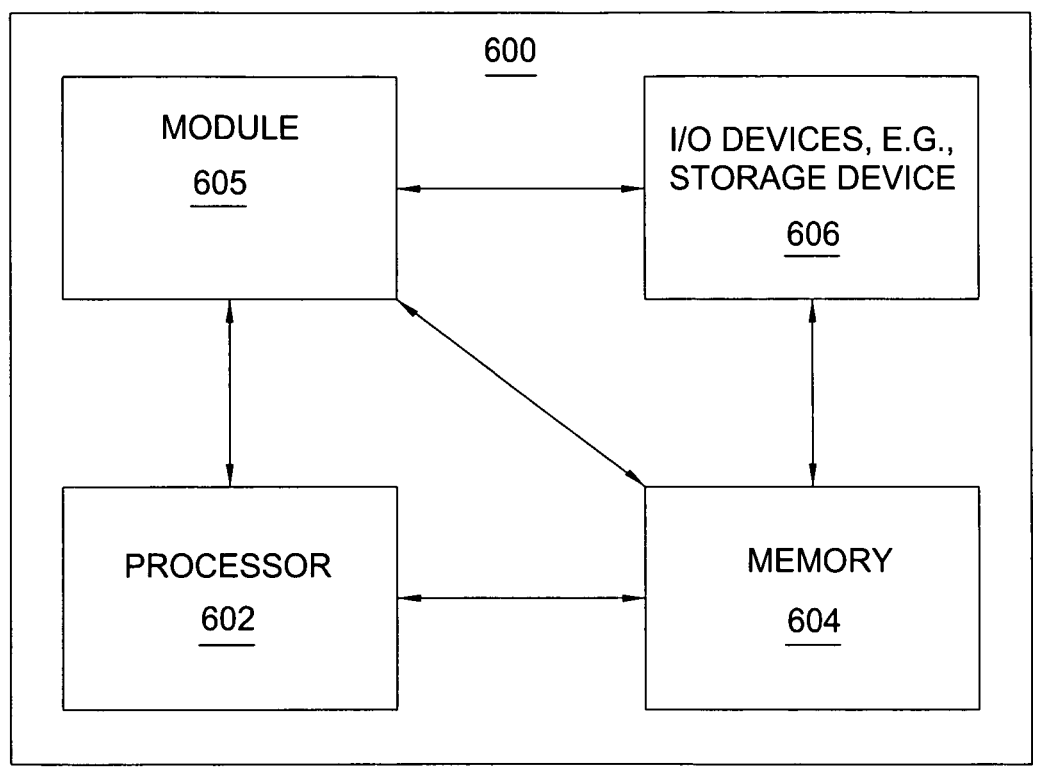
FIG. 6 illustrates a high level block diagram of a general purpose computer suitable for use in performing the functions described herein.

FIG. 6 depicts a high level block diagram of a general purpose computer suitable for use in performing the functions described herein. As depicted in FIG. 6, the system 600 comprises a processor element 602 (e.g., a CPU), a memory 604, e.g., random access memory (RAM) and/or read only memory (ROM), a module 605 for storing and activating Universal Resource Locators (URL) and/or phone numbers from video content, and various input/output devices 606 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 605 for storing and activating Universal Resource Locators (URL) and/or phone numbers from video content can be loaded into memory 604 and executed by processor 602 to implement the functions as discussed above. As such, the present process 605 for storing and activating Universal Resource Locators (URL) and/or phone numbers from video content (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for storing a Universal Resource Locator (URL) or a phone number obtained from a video content in a communication network, comprising:
   presenting said video content to a subscriber, where said video content carries at least one of: an embedded phone number or a URL address;
   receiving a request from said subscriber to store at least one of said Universal Resource Locator (URL) or said phone number selected from said video content; and
   storing said at least one of said Universal Resource Locator (URL) or said phone number in said communication network.

2. The method of claim 1, wherein said communication network is a Service over Internet Protocol (SoIP) network.

3. The method of claim 1, wherein said storing comprises:
   establishing a network address book application session to said subscriber; and
   storing said at least one of said Universal Resource Locator (URL) or said phone number in a network based address book.

4. The method of claim 3, wherein said network address book application session is established by a Session Controller by forwarding said request received from said subscriber to an Address Book Application Server, where said network address book application session is established between said Address Book Application Server and said subscriber.

5. The method of claim 3, wherein said at least one of said Universal Resource Locator (URL) or said phone number is selected by using a pointer device by said subscriber.

6. The method of claim 1, further comprising:
   activating said at least one of said Universal Resource Locator (URL) or said phone number by said subscriber.

7. The method of claim 6, wherein said activating comprises:
   establishing a network address book application session to said subscriber; and
   activating said at least one of said Universal Resource Locator (URL) or said phone number selected by said subscriber.

8. The method of claim 7, wherein said at least one of said Universal Resource Locator (URL) or said phone number is activated by:
   establishing a Voice over Internet Protocol (VoIP) session to said phone number if said phone number is activated; or
   establishing a web session to said URL if said URL is activated.

9. A computer-readable medium having stored thereon a plurality of instructions, the plurality of instructions including instructions which, when executed by a processor, cause the processor to perform the steps of a method for storing a Universal Resource Locator (URL) or a phone number obtained from a video content in a communication network, comprising:
   presenting said video content to a subscriber, where said video content carries at least one of: an embedded phone number or a URL address;
   receiving a request from said subscriber to store at least one of said Universal Resource Locator (URL) or said phone number selected from said video content; and storing said at least one of said Universal Resource Locator (URL) or said phone number in said communication network.

10. The computer-readable medium of claim 9, wherein said communication network is a Service over Internet Protocol (SoIP) network.

11. The computer-readable medium of claim 9, wherein said storing comprises:
establishing a network address book application session to said subscriber; and
storing said at least one of said Universal Resource Locator (URL) or said phone number in a network based address book.

12. The computer-readable medium of claim 11, wherein said network address book application session is established by a Session Controller by forwarding said request received from said subscriber to an Address Book Application Server, where said network address book application session is established between said Address Book Application Server and said subscriber.

13. The computer-readable medium of claim 11, wherein said at least one of said Universal Resource Locator (URL) or said phone number is selected by using a pointer device by said subscriber.

14. The computer-readable medium of claim 9, further comprising:
activating said at least one of said Universal Resource Locator (URL) or said phone number by said subscriber.

15. The computer-readable medium of claim 14, wherein said activating comprises:
establishing a network address book application session to said subscriber; and
activating said at least one of said Universal Resource Locator (URL) or said phone number selected by said subscriber.

16. The computer-readable medium of claim 15, wherein said at least one of said Universal Resource Locator (URL) or said phone number is activated by:
establishing a Voice over Internet Protocol (VoIP) session to said phone number if said phone number is activated; or
establishing a web session to said URL if said URL is activated.

17. An apparatus for storing a Universal Resource Locator (URL) or a phone number obtained from a video content in a communication network, comprising:
means for presenting said video content to a subscriber, where said video content carries at least one of: an embedded phone number or a URL address;
means for receiving a request from said subscriber to store at least one of said Universal Resource Locator (URL) or said phone number selected from said video content; and
means for storing said at least one of said Universal Resource Locator (URL) or said phone number in said communication network.

18. The apparatus of claim 17, wherein said communication network is a Service over Internet Protocol (SoIP) network.

19. The apparatus of claim 17, wherein said storing means comprises:
means for establishing a network address book application session to said subscriber; and
means for storing said at least one of said Universal Resource Locator (URL) or said phone number in a network based address book.

20. The apparatus of claim 19, wherein said network address book application session is established by a Session Controller by forwarding said request received from said subscriber to an Address Book Application Server, where said network address book application session is established between said Address Book Application Server and said subscriber.

* * * * *